United States Patent
Kahrizi et al.

(10) Patent No.: US 9,220,106 B2
(45) Date of Patent: Dec. 22, 2015

(54) TRANSMITTER ARCHITECTURE FOR UPLINK INTER-BAND CARRIER AGGREGATION

(71) Applicant: Broadcom Corporation, Irvine, CA (US)

(72) Inventors: Masoud Kahrizi, Irvine, CA (US); Behnam Mohammadi, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 34 days.

(21) Appl. No.: 14/292,464

(22) Filed: May 30, 2014

(65) Prior Publication Data

US 2015/0264688 A1 Sep. 17, 2015

Related U.S. Application Data

(60) Provisional application No. 61/953,705, filed on Mar. 14, 2014.

(51) Int. Cl.
*H04W 72/04* (2009.01)

(52) U.S. Cl.
CPC .................................. *H04W 72/0453* (2013.01)

(58) Field of Classification Search
None
See application file for complete search history.

(56) References Cited

U.S. PATENT DOCUMENTS

| | | | |
|---|---|---|---|
| 2011/0113616 A1* | 5/2011 | Khonsari | B81B 7/007 29/592.1 |
| 2011/0222490 A1* | 9/2011 | Fischer | H04L 5/0007 370/329 |
| 2012/0106674 A1* | 5/2012 | Lee | H04L 5/001 375/296 |
| 2014/0016604 A1* | 1/2014 | Lee | H04L 5/001 370/329 |
| 2014/0219160 A1* | 8/2014 | Wu | H04L 12/1845 370/312 |

* cited by examiner

*Primary Examiner* — Benjamin H Elliott, IV
(74) *Attorney, Agent, or Firm* — Garlick & Markison; Bruce E. Garlick

(57) ABSTRACT

A transmitter architecture and methodologies supporting uplink inter-band carrier aggregation (CA). In various embodiments, first and second baseband signals are provided to a plurality of passive mixers that selectively combine the baseband signals with differing local oscillation signals to produce outbound RF signals of at least first and second RF frequencies. Depending on the relevant CA mode of operation, the outbound RF signals are amplified and selectively coupled to at least one transmitting antenna for respective transmission over a plurality of frequency bands.

20 Claims, 7 Drawing Sheets

TRANSMITTER ARCHITECTURE FOR UPLINK INTER-BAND CARRIER AGGREGATION

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional Application No. 61/953,705, entitled "TRANSMITTER ARCHITECTURE FOR UPLINK INTER-BAND CARRIER AGGREGATION", filed Mar. 14, 2014, which is hereby incorporated herein by reference in its entirety and made part of the present U.S. Utility patent application for all purposes.

BACKGROUND

1. Technical Field

The present disclosure relates generally to wireless communications and, more particularly, to increased bandwidth utilization.

2. Description of Related Art

In the mobile communication area, voice and data traffic is communicated over the air between wireless devices according to various communication standards. These standards have included universal mobile telecommunications system (UMTS), advanced mobile phone services (AMPS), digital AMPS, global system for mobile communications (GSM), code division multiple access (CDMA), time division synchronous code division multiple access (TD-SCDMA), local multi-point distribution systems (LMDS), multi-channel-multi-point distribution systems (MMDS), Enhanced Data rates for GSM Evolution (EDGE), General Packet Radio Service (GPRS), Long Term Evolution (LTE), as well as others. One relatively recent development is LTE-Advanced (Releases 10 and 11), which uses standards developed under the 3rd Generation Partnership Project (3GPP) and is often marketed as 4G communications technology.

As more constraints are placed on mobile network operators to provide improved data throughput and quality of services, new techniques are constantly being sought to provide such improvements. Network operators and device manufacturers are seeking to offer more attractive and distinctive services and applications to enhance the end user experience, for example, often resulting in increased data usage and demands on network capacity. One way to achieve an increase in data rates is to increase the bandwidth of the down link and uplink communications.

A new technique is currently being developed utilizing the LTE standard, in which the down link bandwidth is increased via so-called carrier aggregation. For example, Release 10 under the LTE standard specifies that radio frequency (RF) carriers from one or multiple base stations (Node B) may be aggregated and jointly used for transmissions to/from a single terminal. That is, instead of a single RF carrier being transmitted from a node (such as a cell tower, Node B, etc.) to a mobile device, Release 10 allows multiple carriers from one or multiple nodes to be aggregated and transmitted down link to a single terminal. Because the use of multiple carriers increases the bandwidth of the transmitted signal, down link data rates to a user terminal or user equipment (UE) may be increased. In Release 10, uplink carrier aggregation is limited to intra-band carrier aggregation, which means that the different carriers are part of the same frequency band. Inter-band uplink carrier aggregation, where the component carriers are located in different frequency bands, is supported in Release 11.

However, in order to process a signal carrying multiple carriers, additional radio front-end circuitry and processing circuitry may be required. In simplistic terms, to process an aggregation of N number of carriers, N radio circuitry may be employed, but at a significant increase in the number of components used as well as a concomitant increase in power requirements relating to the additional circuitry.

DETAILED DESCRIPTION

The embodiments described below may be practiced in a variety of communication networks that utilize wireless technology for communications between a transmission source or sources and a receiving device utilizing one or more communication protocols to transfer voice, video, data and/or other types of information. The particular technology described below pertains generally to LTE/LTE-Advanced communication standards (and subsequent Releases) as applied to mobile devices such as cellular telephones. However, other embodiments need not be limited to these particular standards, and other communication standards and protocols may be applicable for use with the described embodiments and/or other embodiments.

Further, an uplink Carrier Aggregation (CA) transmission technology described herein may be applicable to communications utilizing either or both of Frequency Division Duplexing (FDD) and Time Division Duplexing (TDD). Also, the particular embodiments described herein address the processing of up to three component carriers (CCs) that are aggregated in a signal to a receiving terminal, such as User Equipment (UE) in a cellular network, but other embodiments may service additional component carriers, as well as utilize various other wireless devices.

Figure 1:
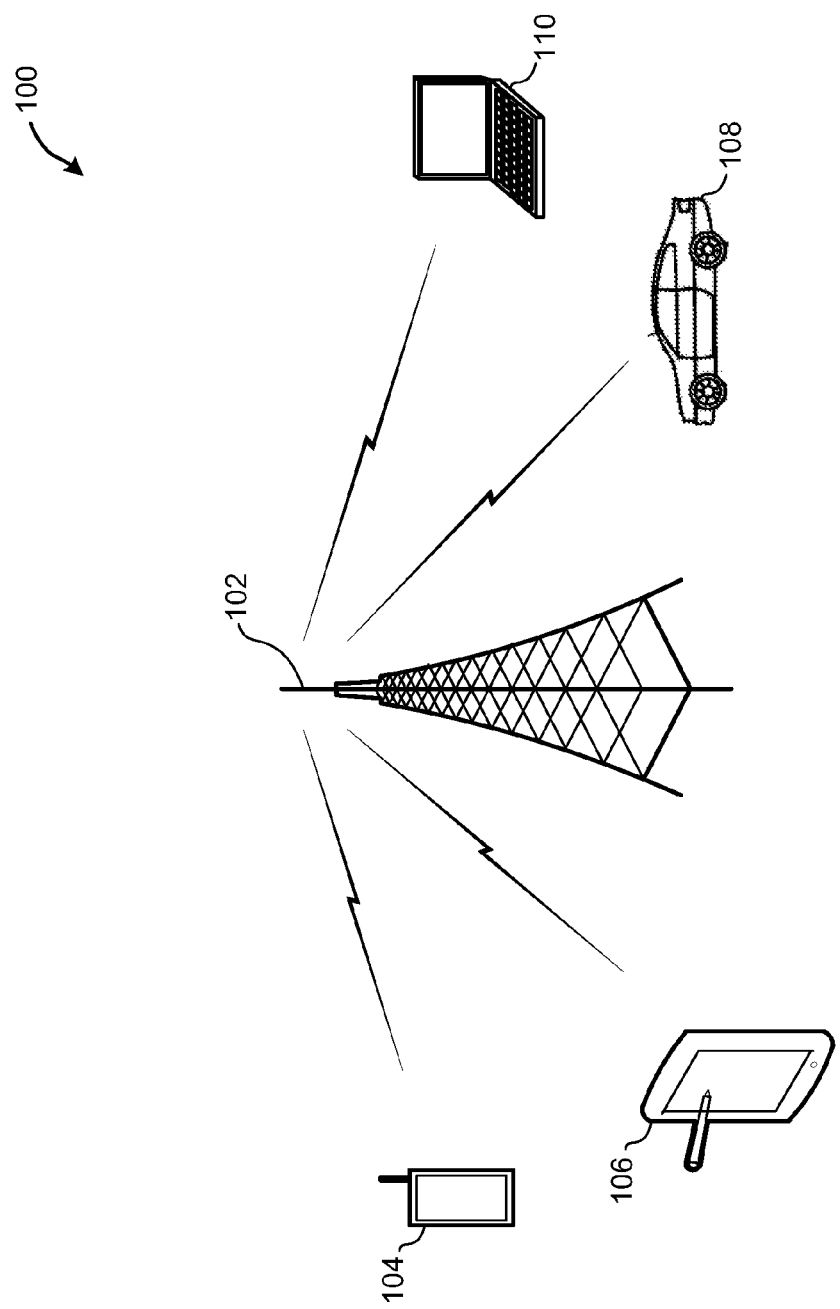
FIG. 1 is a system diagram illustrating an example wireless communication network connecting a number of different mobile devices to a transmitting/receiving node that transmits and receives multiple component carrier signals.

FIG. 1 is a system diagram illustrating an example wireless communication network connecting a number of different mobile devices to a transmitting/receiving node that transmits and receives multiple component carrier signals. In FIG. 1, a system 100 is shown that includes a variety of mobile devices 104-110 configured to operate within a network having a transmitting/receiving node 102. In the example system 100, transmitting/receiving node 102 is a cellular communication node, commonly referred to as a base station or Node B. However, transmitting/receiving node 102 need not be limited to cellular communications. Other embodiments may employ different communication technology from different wireless transmitting sources. Furthermore, instead of a single transmitting/receiving node 102, multiple such nodes may be used for transmission of the multiple component carriers, wherein a respective one of the multiple transmitting sources transmits one or more component carrier(s) that comprise the aggregated signal sent to a receiver.

In the exemplary system 100, device 104 is a mobile phone (e.g., cell phone, smartphone, etc.), device 106 is a tablet computer with cellular capabilities, device 108 is a device affixed in a vehicle (e.g., a communication device or GPS navigation system with dual communication link), and device 110 is a notebook computer or a personal computer (PC) with wireless capabilities. It is noted that other types of devices may be present within system 100.

Devices 104-110, which are sometimes referred to as User Equipment (UE), communicate with transmitting/receiving node 102 utilizing one or more communication protocols and/or standards. As noted above, the network of system 100 may use LTE or 4G communication standards/protocols to transmit voice, audio, video, data, etc. from transmitting/receiving node 102 to receivers of devices 104-110 and vice versa. In particular, transmitted signals may carry multiple component carrier signals that are aggregated and directed to a receiving device. Carrier signals involve a carrier frequency that represents a center frequency of a radio frequency (RF) channel. Release 10 of the LTE standard permits up to five such component carrier signals to be aggregated. That is, from Release 10 onward, transmission bandwidth may be extended by means of the so-called Carrier Aggregation (CA) technique, where multiple RF carriers are aggregated and jointly, or substantially simultaneously, transmitted to a single terminal. Such carrier aggregation increases the bandwidth to increase the uplink/down link data rates. A receiver of multiple component carrier signals processes the different component carrier signals separately and aggregates the processed components to recover the information contained in the multiple component carrier signals.

Thus, for system 100, a wireless link may implement component carrier aggregation in transmitting an RF signal between transmitting/receiving node 102 (or a plurality of nodes 102) and devices 104-110. The description below illustrates the use of up to three such component carrier signals that are aggregated. The signals communicated between transmitting/receiving node 102 and respective devices 104-110 may have one, two or three component carrier signals. Depending on the order of allocation in the network, the three component carriers are sometimes referred to as a Primary Component Carrier (PCC), a Secondary Component Carrier (SCC) and a Tertiary Component Carrier (TCC). When only one component carrier is present, only the PCC is used. When two component carriers are present, the carriers are PCC and SCC. When all three are present, the carriers are PCC, SCC and TCC.

Although a single transmitting/receiving node 102 is illustrated in FIG. 1, the component carrier signals may be transmitted from multiple transmitting sources. Accordingly, PCC may be transmitted from a first transmitting source, SCC from a second transmitting source and TCC from a third transmitting source. Likewise, one component carrier may be transmitted from one transmitting source, while two others may be transmitted from a second transmitting source. Other combinations are possible for transmitting component carriers from multiple transmitting sources. For simplicity, the description below refers to a single transmitting/receiving node, however, it is understood that the different component carrier signals may be respectively transmitted/received by one or a plurality of transmitting sources.

Depending on the network and/or the geographic location of a given network, the various RF frequency bands and carrier frequency allocations may differ. In some networks, the network frequency allocation allows for two or more carriers to be in the same range of frequencies allocated as a particular band (e.g., frequency band) so that the multiple component carriers reside within the same allocated band (intra-band), whereas in other applications, one or more carriers reside in different allocated frequency bands (inter-band).

Figure 2:
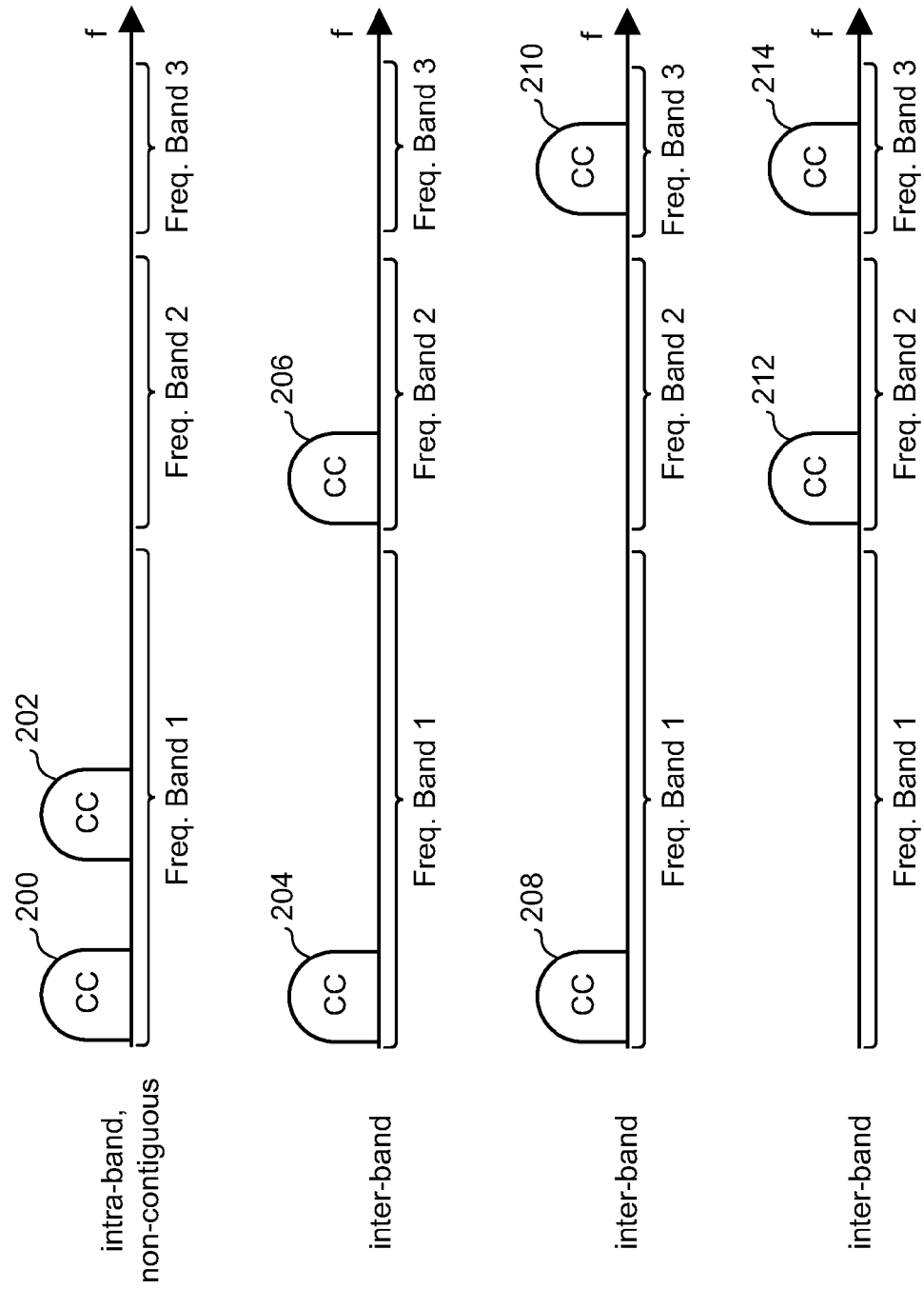
FIG. 2 is a series of frequency diagrams illustrating exemplary embodiments of intra-band and inter-band carrier aggregation (CA).

FIG. 2 is a series of frequency diagrams illustrating exemplary embodiments of intra-band and inter-band CA. Referring first to intra-band CA, when two or more component carriers are allocated within the same allocated frequency band, the CA may be contiguous or non-contiguous. In Contiguous Carrier Aggregation (CCA), component carriers are located in adjacent channels. For example, with two contiguous component carriers, a first channel having a bandwidth (BW) of 20 MHz may be combined with an adjacent channel having 20 MHz BW to effectively provide a super BW channel of 40 MHz. As illustrated by CCs 200 and 202, Non-Contiguous Carrier Aggregation (NCCA) uses carriers that are located in the same allocated band (shown here as frequency band 1), but in non-adjacent channels.

As illustrated, inter-band NCCA may be performed across two or more frequency bands. For example, a first CC 204 may be located in frequency band 1, while a second CC 206 is located in frequency band 2 (which may be of equal, greater or less width than frequency band 1). Similarly, a first CC 208 may be in frequency band 1 and a second CC 210 may be in frequency band 3, or a first CC 212 may be in frequency band 2 and a second CC 214 may be in frequency band 3. Many variations in both the number of CCs and the number of frequency bands are possible.

Figure 3:
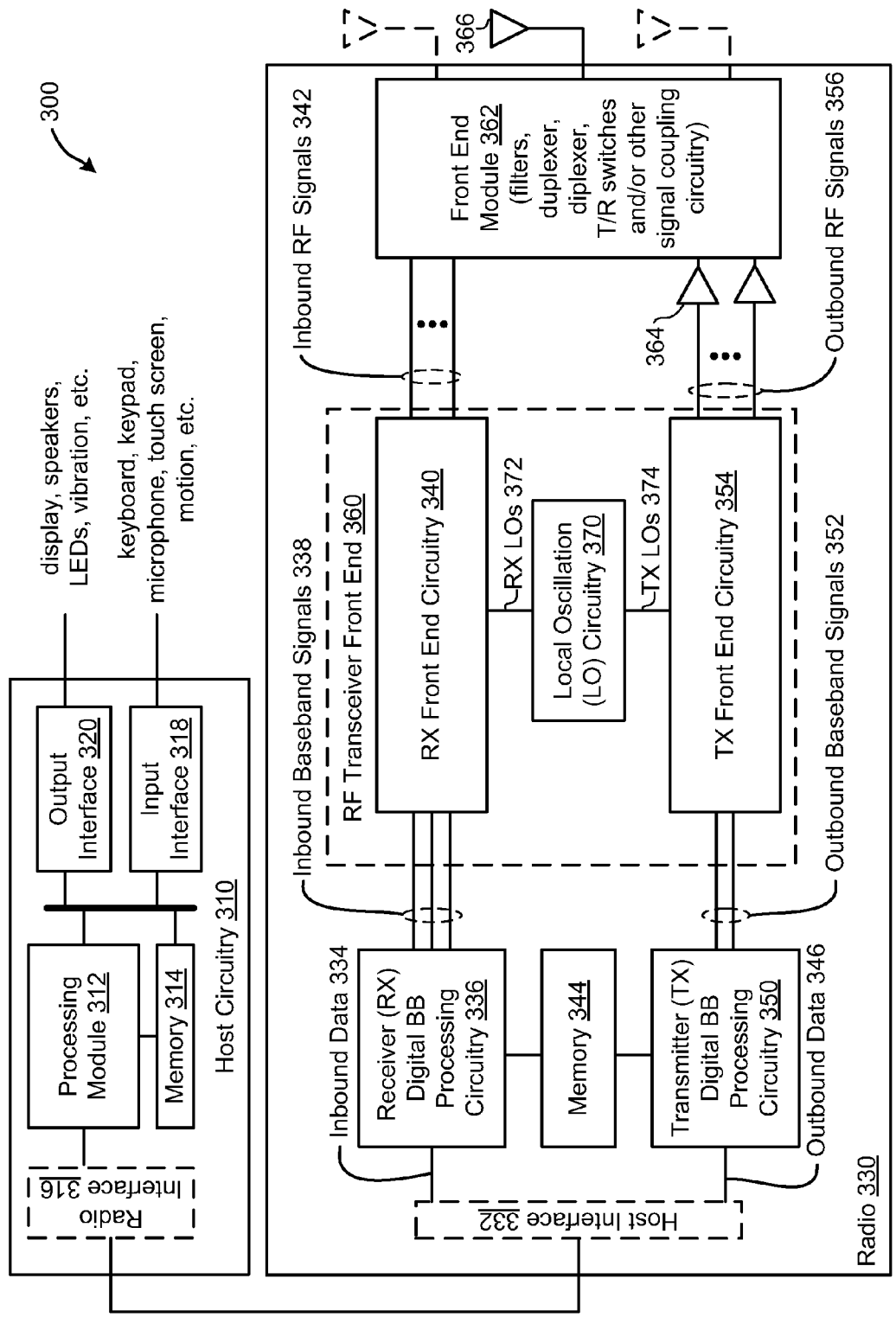
FIG. 3 is a functional block diagram illustrating an exemplary embodiment of a wireless communication device supporting uplink inter-band CA.

FIG. 3 is a functional block diagram illustrating an exemplary embodiment of a wireless communication device 300 (such as a wireless communication device 104-110 of FIG. 1) supporting uplink inter-band CA. In the illustrated embodiment, a radio 330 is operably coupled to host circuitry 310 of the wireless communication device 300. For cellular telephone hosts, the radio 330 is typically a built-in component. For tablet computing devices, laptops, personal computers and/or other wireless communication devices, the radio 330 may be built-in or an externally coupled component. It is noted that "front end" is a generic term for the circuitry between an antenna and the first intermediate frequency (IF) stage. In some instances, structures and components described herein are illustrated in block diagram form in order to avoid obscuring the concepts of the subject technology.

As illustrated, the wireless communication device 300 includes a processing module 312, memory 314, a radio interface 316, an input interface 318, and an output interface 320. The processing module 312 and memory 314 are configured to execute instructions that enable functionality of the wireless device. For example, for a smartphone the processing module 312 may perform communication functions in accordance with a particular cellular standard, multimedia processing functions, etc.

The radio interface 316 allows data to be received from and sent to the radio 330. For data received from the radio 330

(e.g., inbound data), the radio interface 316 provides the data to the processing module 312 for further processing and/or routing to the output interface 320. The output interface 320 provides connectivity to an output display device such as a display, monitor, speakers, LEDs, etc., such that the received data may be displayed or otherwise utilized. The radio interface 316 also provides data from the processing module 312 to the radio 330. The processing module 312 may receive the outbound data from an input device such as a keyboard, keypad, microphone, biometric sensor, touch screen, etc., via the input interface 318, or generate the data itself. For data received via the input interface 318, the processing module 312 may perform a corresponding host function on the data and/or route it to the radio 330 via the radio interface 316.

Radio 330 includes a host interface 332 (in embodiments where separate integrated circuit devices are utilized), receiver (RX) digital BB processing circuitry 336, transmitter (TX) digital BB processing circuitry 350, memory 344, and RF transceiver front end 360. The RF transceiver front end 360 of the illustrated embodiment includes RX front end circuitry 340, local oscillation (LO) circuitry 370 (which may be implemented, at least in part, using one or more voltage controlled oscillator (VCOs), and TX front end circuitry 354 (various exemplary embodiments of which are described more fully below with reference to FIGS. 4-7). The illustrated radio 330 also includes power amplifiers (PA's) 364 (which may be discrete or "off-chip" components or implemented as part of a front end module in certain embodiments), front end module 362 (including, for example, TX and RX filters, a duplexer, a diplexer, a T/R switch module and/or other signal coupling circuitry) and an antenna 366. The antenna 366 may be a single antenna or antenna array that is shared by the transmit paths and receive paths as regulated by a T/R switch module. A given antenna implementation will generally depend on the particular standard or standards to which the wireless communication device is compliant.

The RX digital BB processing circuitry 336 and the TX digital BB processing circuitry 350, in combination with operational instructions stored in memory 344, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, CA mode signal generation, and/or digital baseband to IF conversion. The digital BB processing circuitry 336 and 350 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog and digital circuitry, and/or any device that manipulates signals (analog and/or digital) based on operational instructions. The memory 344 may be a single memory device or a plurality of memory devices. Such a memory device may be a read-only memory, random access memory, volatile memory, non-volatile memory, static memory, dynamic memory, flash memory, and/or any device that stores digital information. Note that when the digital BB processing circuitry 336 and/or 350 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 330 receives outbound data 346 from the host circuitry 310 via the host interface 332. The host interface 332 routes the outbound data 346 to the TX digital BB processing circuitry 350, which processes the outbound data 346 in accordance with a particular wireless communication standard to produce outbound baseband signals 352 on a plurality of baseband signal paths. The outbound baseband signals 352 are digital baseband signals (e.g., have a zero IF) or digital low IF signals, where the low IF typically will generally be in the frequency range of one hundred kHz (kilo-Hertz) to a few MHz (Mega-Hertz).

The TX front end circuitry 354 performs a number of functions, including converting the outbound baseband signals 352 from the digital domain to the analog domain and filtering and/or adjusting the gain of the analog signals prior to providing the signals to IF mixing up conversion circuitry that converts the analog baseband or low IF signals into outbound RF signals 356 based on transmitter local oscillation (TX LO) signals 374 provided by local oscillation circuitry 370. The power amplifiers 364 amplify the outbound RF signals 356 (which may be filtered by front end module 362), and the antenna 366 transmits the outbound RF signals 356 to a targeted device(s) such as a base station, an access point and/or another wireless communication device. As described more fully below, multiple RF signal paths may be provided to perform carrier aggregation-based transmissions.

The radio 330 also receives, via the antenna 366, inbound RF signals 342 which were transmitted by a base station, an access point, or another wireless communication device. The antenna 366 provides the inbound RF signals, via the front end module 362, to a low noise amplifier (LNA) (not separately illustrated) of the RX front end circuitry 340. The LNA amplifies the RF signals to produce amplified inbound RF signals. RX front end circuitry 340 performs a number of functions, including converting the amplified inbound RF signals into inbound low IF signals or baseband signals based on receiver local oscillation (RX LO) signals 372 provided by local oscillation circuitry 370, and filtering the inbound low IF signals or baseband signals to produce filtered inbound signals. The filtered inbound signals are then converted from the analog domain to the digital domain to produce inbound baseband signals 338, where the inbound baseband signals 338 are digital baseband signals or digital low IF signals, and where the low IF typically will be in the frequency range of one hundred kHz to a few MHz. The RX digital BB processing circuitry 336 decodes, descrambles, demaps, and/or demodulates the inbound baseband signals 338 to produce inbound data 334 in accordance with the particular wireless communication standard(s) being implemented by radio 330. The host interface 332 provides the inbound data 334 to the host circuitry 310 via the radio interface 316.

The wireless communication device of the embodiment 300 of FIG. 3 may be implemented using one or more integrated circuits or RF integrated circuits (RF ICs). For example, the host circuitry 310 may be implemented on one integrated circuit, the RX digital BB processing circuitry 336, the TX digital BB processing circuitry 350 and memory 344 may be implemented on a second integrated circuit, and the remaining components of the radio 330 (including antenna 366 in some embodiments), may be implemented on a third integrated circuit. As an alternate example, the radio 330 may be implemented on a single integrated circuit. As yet another example, the processing module 312 of the host circuitry 310 and the digital BB processing circuitry 336 and 350 may be a common processing device implemented on a single integrated circuit. Further, memory 314 and memory 344 may be implemented on a single integrated circuit and/or on the same integrated circuit as processing module 312 and the digital BB processing circuitry 336 and 350, respectively.

Figure 4:
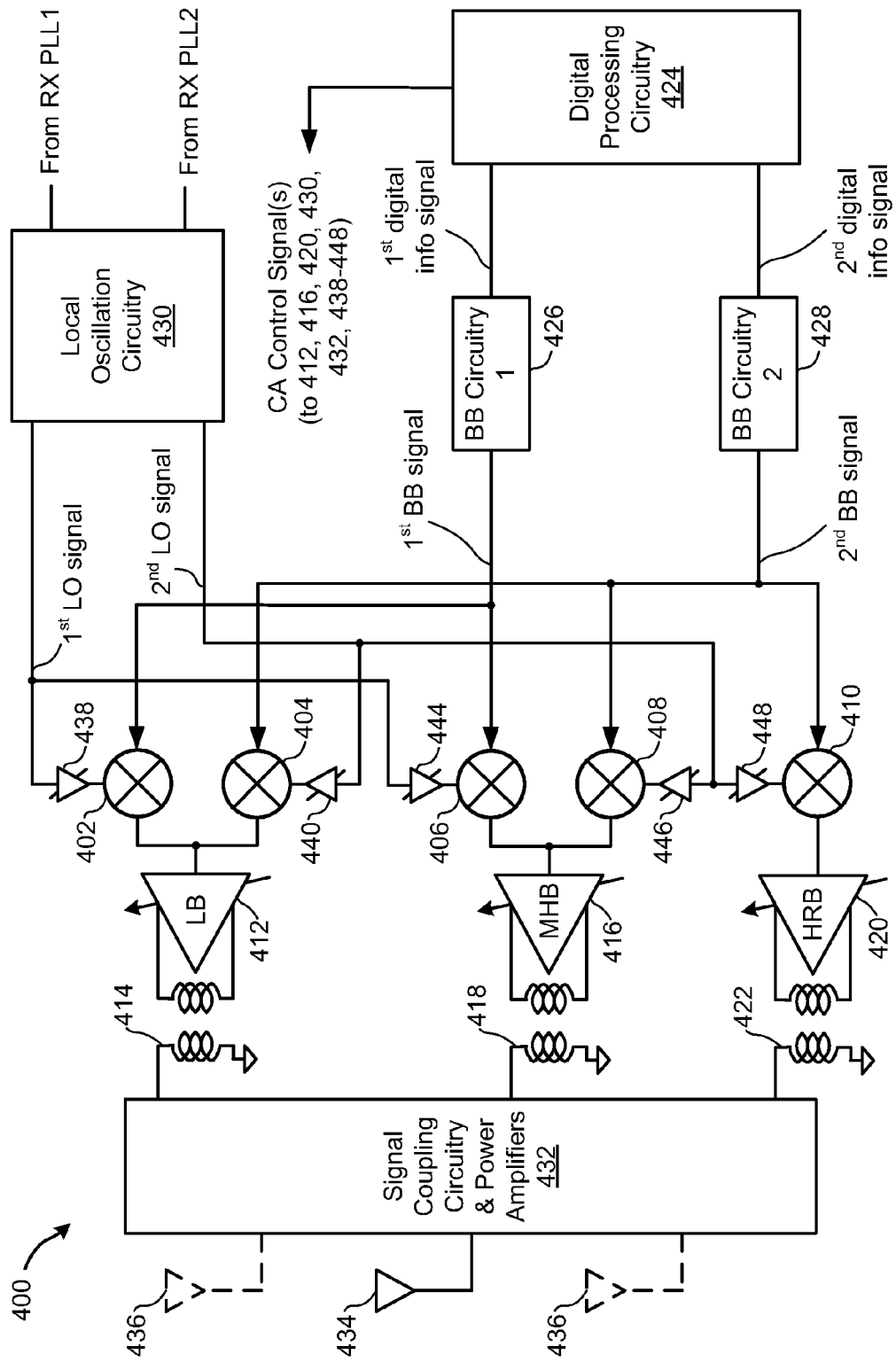
FIG. 4 is a circuit diagram illustrating exemplary transmitter circuitry to support uplink inter-band CA.

FIG. 4 is a circuit diagram illustrating exemplary transmitter circuitry 400 to support uplink inter-band CA. In the illustrated embodiment, passive mixers 402-410 are utilized to minimize switching at baseband frequencies and improve isolation between the first and second BB signal paths. In addition, switching in the LO pathways is also minimized, thereby improving isolation at the LO level and providing improved spurious response for the transmitter circuitry 400.

In the illustrated embodiment, digital processing circuitry 424 provides first and second digital information signals to baseband circuitry 426 and baseband circuitry 428, respectively. Baseband circuitry 426 operates to convert the first digital information signal into a first baseband (analog) signal, while baseband circuitry 428 operates to convert the second digital information signal into a second baseband signal. The digital processing circuitry 424 of this embodiment further functions to provide one or more CA control signals used to control various other circuit elements based upon a carrier mode of operation.

Local oscillation circuitry 430 produces first and second LO signals (typically of differing frequencies) that are selectively utilized to convert the first and second baseband signals into RF signals as generally described herein. In certain embodiments and modes of operation (e.g., TDD implementations), the local oscillation circuitry 430 may leverage signals from RX phase locked loops (PLLs). Alternatively, or in addition, the local oscillation circuitry 430 may include one or more frequency synthesizers (e.g., VCOs) to generate the first and second LO signals used for up-conversion of baseband signals.

In this embodiment, the first baseband signal is provided to mixers 402 and 406, while the second baseband signal is provided to mixers 404, 406 and 410. Likewise, the first LO signal is provided to the mixers 402 and 406 via buffers 438 and 444, respectively. The second LO signal is provided to the mixers 404, 408 and 410 via buffers 440, 446 and 448, respectively. In certain embodiments, each of the buffers 438-448 (e.g., variable gain buffers) may be selectively enabled by CA control signals corresponding to the relevant mode of operation. When effectively enabled and receiving an LO signal, each of the mixers 402-410 operate to combine the LO signal and a baseband signal to produce an RF signal of varying frequency (as determined by the frequency of the LO signal). As referenced herein, the output of mixer 402 produces a first RF signal, the output of mixer 404 produces a second RF signal, the output of mixer 406 produces a third RF signal, the output of mixer 408 produces a fourth RF signal, and the output of mixer 410 produces a fifth RF signal.

In a first RF signal path configured to service a first frequency band, the outputs of the mixer pair 402 and 404 are coupled to produce a first outbound RF signal. In a second RF signal path configured to service a second frequency band, the outputs of the mixer pair 406 and 408 are coupled to produce a second outbound RF signal. The first and second outbound RF signals are individually provided to the inputs of amplifiers 412 and 416, respectively. In the illustrated embodiment, amplifier 420 in a third RF signal path receives the RF signal output of mixer 410.

In certain embodiments, the outputs of a mixer pairs 402/404 and 406/408 may be selectively controlled through enabling and disabling of respective buffers 438-446 (e.g., via CA control signals generated by digital processing circuitry 424). For example, in an inter-band CA mode of operation involving the first RF signal path, only one of the buffers 438 and 440 (and/or 444 and 446) is typically enabled. As referenced in the herein, the buffers 338 and 340 function as first enablement circuitry, the buffers 444 and 446 function as second enablement circuitry, and the buffer 448 functions as third enablement circuitry. It is noted that baseband signal input to a given mixer may also be disabled/decoupled if the LO signal input to the mixer is disabled.

In the illustrated embodiment, amplifier 412 drives a differential signal to transformer 414 (which converts the differential signal to a single ended signal for transmission), amplifier 416 drives transformer 418, and amplifier 420 drives a transformer 422. Each of the amplifiers (or "pre-amplifiers" with reference to the power amplifiers 364) 412, 416 and 420 is responsible for conditioning signals for transmission over a specified frequency band. For example and without limitation, in one exemplary embodiment the following frequency allocation is used:

| | |
|---|---|
| Low Band (LB) | 600-1000 MHz |
| Mid/High Band (MHB) | 1400-2000 MHz |
| Higher Band (HRB) | 2300-2600 MHz |

Such frequency band groupings may be based on frequency spectrum allocation for a network, a communication standard, some other requirement or arbitrarily set. Signal coupling circuitry 432, which may also include power amplifiers such as described above, operates to selective couple the first and second outbound RF signals and the RF signal output of mixer 410 to one or more transmitting antennas 434/436. It is noted that complex (I/Q) signal paths may be utilized throughout the illustrated embodiments of FIGS. 3-5, but have been omitted for sake of clarity.

Figure 5:
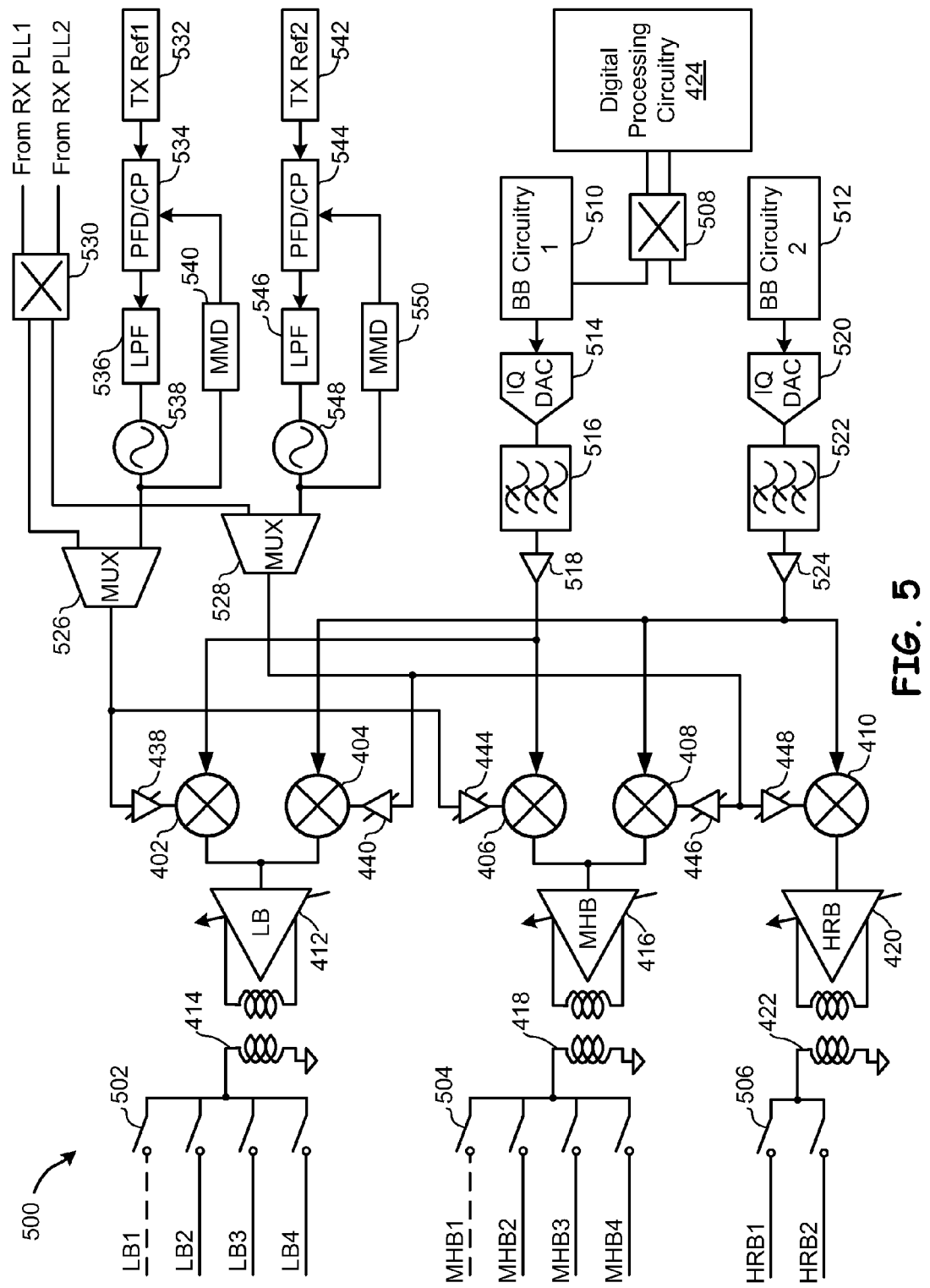
FIG. 5 is a circuit diagram illustrating further details of exemplary transmitter circuitry to support uplink inter-band CA.

FIG. 5 is a circuit diagram illustrating further details of exemplary transmitter circuitry 500 to support uplink inter-band CA. In this embodiment, the signal coupling circuitry is implemented by a first plurality of switches 502 corresponding to component carrier frequencies in a first frequency band LB, a second plurality of switches 504 corresponding to component carrier frequencies in a second frequency band MHB, and a third plurality of switches 506 corresponding to a third frequency band HRB. In certain embodiments the switches may be selectively activated, for example, by CA control signals such as those produced by digital processing circuitry 424 (FIG. 4).

In the illustrated embodiment, a first LO signal is generated by a first TX frequency synthesizer (or TX PLL) comprised of a first TX reference 532, a phase-frequency detector and charge pump (PFD/CP) 534, a loop filter (LPF) 536, an oscillator 538 (which selectively operates as transmitter LO), and a multi-modulus divider (MMD) 540 in its feedback loop. In this embodiment, the output of the oscillator 538 is coupled to MMD 540 which frequency divides the first LO signal as an input to PFD/CP 534. Similarly, a second LO signal is generated by a second TX frequency synthesizer (or TX PLL) comprised of a second TX reference 542, a PFD/CP 544, a LPF 546, an oscillator 548, and a MMD 550.

In certain embodiments, muxes 526 and 528 may be used to support LTE communications in TDD mode, in which case the LO signal may be provided directly from one or more RX PLLs. In such embodiments, the LO signal produced by the first TX PLL, as well as a LO signal from a first RX PLL, may be provided to the inputs of a mux 526, the selected output of which corresponds to the first LO signal of FIG. 4. The LO signal produced by the second TX PLL, as well as a LO signal from a second RX PLL, are similarly provided to the inputs of a mux 528, the output of which corresponds to the second LO signal of FIG. 4. In this embodiment, a cross-over switch or swapping circuit 530 may be utilized to reverse the RX PLL inputs to the muxes 526 and 528.

In this embodiment, baseband signal processing functionality for the first and second BB signals is provided by known elements 510-518 (corresponding to BB circuitry 426) and known elements 512-524 (corresponding to BB circuitry 428). A cross-over switch or swapping circuit 508 may be utilized to reverse the first digital information signal and the second digital information signal as desired (e.g., depending on the CA mode of operation). As will be appreciated, other topology variations may be implemented without departing from the spirit of the disclosure.

Figure 6:
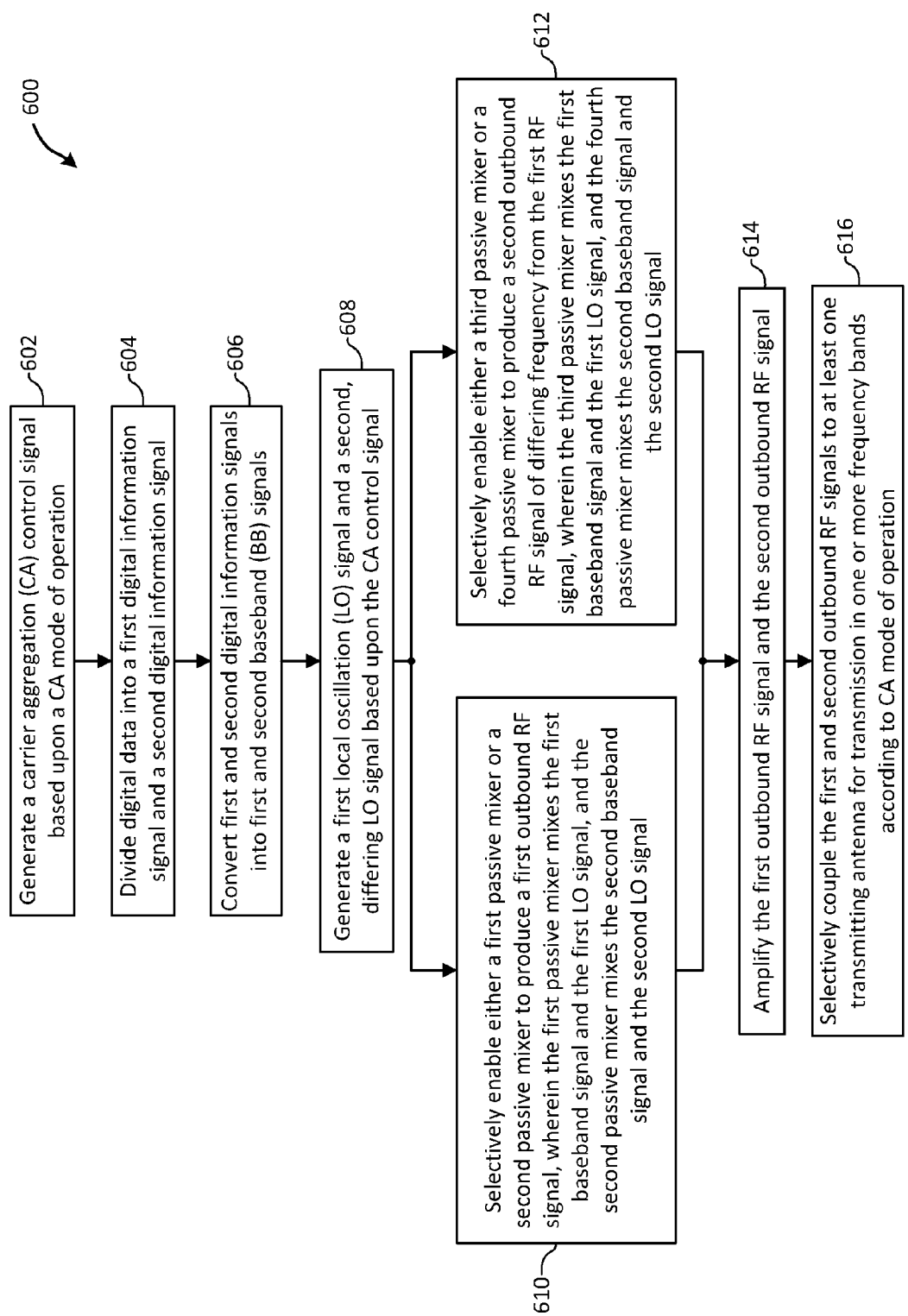
FIG. 6 is an operational flow diagram illustrating an exemplary method for transmitting radio frequency (RF) signals utilizing uplink inter-band CA.

FIG. 6 is an operational flow diagram illustrating an exemplary method for transmitting radio frequency (RF) signals utilizing uplink inter-band CA. First, a CA control signal(s) is generated based upon the desired CA mode of operation (602). Next, or in conjunction therewith, the digital data to be transmitted is divided into a first digital information signal and a second digital information signal (604). The first and second digital information signals are then converted into first and second baseband signals (606). As determined by the frequencies of the CCs to be transmitted (e.g., via CA control signaling), a first local oscillation (LO) signal and a second, differing LO signal are then generated (608).

In the illustrated embodiment, first and second outbound RF signals of differing frequencies are generated. In particular (610), either a first passive mixer or a second passive mixer is selectively enabled to produce the first outbound RF signal, wherein the first passive mixer mixes the first baseband signal and the first LO signal (producing a first RF signal) and the second passive mixer mixes the second baseband signal and the second LO signal (producing a second RF signal at a differing frequency from the first RF signal). Likewise (612), either a third passive mixer or a fourth passive mixer is selectively enabled to produce the second outbound RF signal, wherein the third passive mixer mixes the first baseband signal and the first LO signal (producing a third RF signal) and the fourth passive mixer mixes the second baseband signal and the second LO signal (producing a fourth RF signal at a differing frequency from the third RF signal).

The first and second outbound RF signals are then amplified (e.g., by pre-amplifiers and power amplifiers) for transmission (614). In accordance with the active CA mode of operation, the amplified first and second outbound RF signals are then selectively coupled to one or more transmitting antennas for wireless transmission in one or more frequency bands (616).

Figure 7:
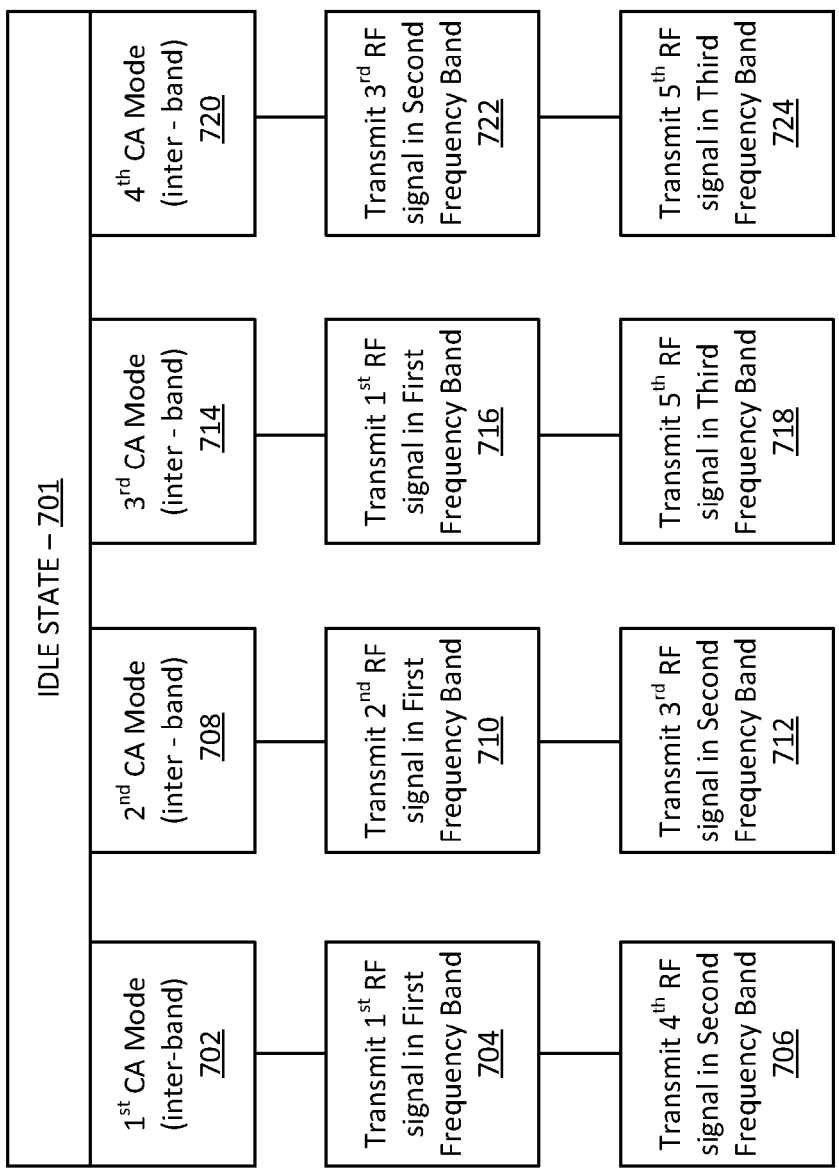
FIG. 7 is an operational flow diagram illustrating exemplary methods for performing uplink inter-band CA transmissions.

FIG. 7 is an operational flow diagram 700 illustrating exemplary methods for performing uplink inter-band CA transmissions. In the illustrated embodiment, various combinations of five RF signals are transmitted over various combinations of first, second and third frequency bands following an idle state 701.

In a first inter-band CA mode 702, a first RF signal is transmitted in the first frequency band (704) and a fourth RF signal is transmitted in the second frequency band (706). In a second inter-band CA mode 708, a second RF signal is transmitted in the first frequency band (710) and a third RF signal is transmitted in the second frequency band (712).

In a third inter-band CA mode 714, a first RF signal is transmitted in the first frequency band (716), while a fifth RF signal is transmitted in the third frequency band (718). In a fourth inter-band CA mode 720, a third RF signal is transmitted in the second frequency band (722) while a fifth RF signal is transmitted in the third frequency band (724).

As may be used herein, the term "associated with", includes direct and/or indirect association of separate items and/or one item being embedded within another item. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to" or "operably coupled to" indicates that an item includes one or more of power connections, input(s), output(s), etc., to perform, when activated, one or more its corresponding functions and may further include inferred coupling to one or more other items.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

As may also be used herein, the terms "processing module", "processing circuit", "processing circuitry", "processor" and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the present disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed subject matter. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the claimed subject matter. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A wireless communication device comprising:
digital processing circuitry configured to:
divide digital data into a first digital information signal and a second digital information signal; and
generate a carrier aggregation control signal based upon a carrier aggregation mode of operation;
first baseband circuitry configured to convert the first digital information signal into a first baseband signal;
second baseband circuitry configured to convert the second digital information signal into a second baseband signal;
local oscillation (LO) circuitry configured to produce a first LO signal and a differing second LO signal based upon the carrier aggregation control signal;
first RF signal path circuitry configured to service a first frequency band, comprising:
a first passive mixer configured to mix the first baseband signal and the first LO signal to produce a first RF signal at a first RF frequency;
a second passive mixer configured to mix the second baseband signal and the second LO signal to produce a second RF signal at a second RF frequency that differs from the first RF frequency, the output of the first passive mixer coupled to the output of the second passive mixer to produce a first outbound RF signal;
first enablement circuitry configured to selectively provide the first LO signal to the first passive mixer or the second LO signal to the second passive mixer; and
a first amplifier configured to amplify the first outbound RF signal; and
second RF signal path circuitry configured to service a second frequency band, comprising:
a third passive mixer configured to mix the first baseband signal and the first LO signal to produce a third RF signal at a third RF frequency;
a fourth passive mixer configured to mix the second baseband signal and the second LO signal to produce a fourth RF signal at a fourth RF frequency that differs from the third RF frequency, the output of the third passive mixer coupled to the output of the fourth passive mixer to produce a second outbound RF signal;
second enablement circuitry configured to selectively provide the first LO signal to the third passive mixer or the second LO signal to the fourth passive mixer; and
a second amplifier configured to amplify the second outbound RF signal.

2. The wireless communication device of claim 1, further comprising third RF signal path circuitry configured to service a third frequency band, comprising:
a fifth passive mixer configured to mix the second baseband signal and the second LO signal to produce a fifth RF signal at a fifth RF frequency;
third enablement circuitry configured to selectively provide the second LO signal to the fifth passive mixer; and
a third amplifier configured to amplify the fifth RF signal.

3. The wireless communication device of claim 2, further comprising signal coupling circuitry configured to selectively couple the first outbound RF signal, the second outbound RF signal and the fifth RF signal to at least one transmitting antenna.

4. The wireless communication device of claim 3, wherein each of the first passive mixer, the second passive mixer, the third passive mixer, the fourth passive mixer, and the fifth passive mixer is selectively enabled based upon the carrier aggregation mode of operation.

5. The wireless communication device of claim 3, wherein:
in a first carrier aggregation mode of operation supporting inter-band carrier aggregation, the first RF signal is transmitted in the first frequency band and the fourth RF signal is transmitted in the second frequency band;
in a second carrier aggregation mode of operation supporting inter-band carrier aggregation, the second RF signal is transmitted in the first frequency band and the third RF signal is transmitted in the second frequency band;
in a third carrier aggregation mode of operation supporting inter-band carrier aggregation, the first RF signal is transmitted in the first frequency band and the fifth RF signal is transmitted in the third frequency band; and
in a fourth carrier aggregation mode of operation supporting inter-band carrier aggregation, the third RF signal is transmitted in the second frequency band and the fifth RF signal is transmitted in the third frequency band.

6. The wireless communication device of claim 1, wherein:
in a first carrier aggregation mode of operation supporting inter-band carrier aggregation, the first RF signal is transmitted in the first frequency band and the fourth RF signal is transmitted in the second frequency band; and
in a second carrier aggregation mode of operation supporting inter-band carrier aggregation, the second RF signal is transmitted in the first frequency band and the third RF signal is transmitted in the second frequency band.

7. The wireless communication device of claim 1, wherein each of the first passive mixer, the second passive mixer, the third passive mixer, and the fourth passive mixer are selectively enabled based upon the carrier aggregation mode of operation.

8. The wireless communication device of claim 1, wherein the LO circuitry includes:
a first multiplexer configured to multiplex between the first LO signal used in a Frequency Division Duplex (FDD) mode of operation and a first received LO signal used in a Time Division Duplex (TDD) mode of operation; and
a second multiplexer configured to multiplex between the second LO signal used in a FDD mode of operation and a second received LO signal used in a TDD mode of operation.

9. A method for operating a wireless communication device comprising:
generating a carrier aggregation control signal based upon a carrier aggregation mode of operation;
dividing digital data into a first digital information signal and a second digital information signal;
converting the first digital information signal into a first baseband signal;
converting the second digital information signal into a second baseband signal;
generating a first local oscillation (LO) signal;
generating a differing second LO signal based upon the carrier aggregation control signal;
by first RF signal path circuitry configured to service a first frequency band:
selectively enabling either a first passive mixer or a second passive mixer to produce a first outbound RF signal, wherein:
the first passive mixer, when enabled, mixes the first baseband signal and the first LO signal to produce a first RF signal at a first RF frequency;
the second passive mixer, when enabled, mixes the second baseband signal and the second LO signal to produce a second RF signal at a second RF frequency that differs from the first RF frequency, wherein the first RF signal or the second RF signal is the first outbound RF signal; and
amplifying the first outbound RF signal; and
by second RF signal path circuitry configured to service a second frequency band:
selectively enabling either a third passive mixer or a fourth passive mixer to produce a second outbound RF signal, wherein:
the third passive mixer, when enabled, mixes the first baseband signal and the first LO signal to produce a third RF signal at a third RF frequency;
the fourth passive mixer, when enabled, mixes the second baseband signal and the second LO signal to produce a fourth RF signal at a fourth RF frequency that differs from the third RF frequency, wherein the third RF signal or the fourth RF signal is the second outbound RF signal; and
amplifying the second outbound RF signal.

10. The method of claim 9, further comprising, in third RF signal path circuitry configured to service a third frequency band:
selectively enabling a fifth passive mixer to mix the second baseband signal and the second LO signal to produce a fifth RF signal at a fifth RF frequency; and
amplifying the fifth RF signal.

11. The method of claim 10, further comprising selectively coupling the first outbound RF signal, the second outbound RF signal and the fifth RF signal to at least one transmitting antenna.

12. The method of claim 10, wherein the first passive mixer, the second passive mixer, the third passive mixer, the fourth passive mixer, and the fifth passive mixer are selectively enabled based upon the carrier aggregation mode of operation.

13. The method of claim 10, wherein:
in a first carrier aggregation mode of operation supporting inter-band carrier aggregation, the first RF signal is transmitted in the first frequency band and the fourth RF signal is transmitted in the second frequency band;
in a second carrier aggregation mode of operation supporting inter-band carrier aggregation, the second RF signal is transmitted in the first frequency band and the third RF signal is transmitted in the second frequency band;
in a third carrier aggregation mode of operation supporting inter-band carrier aggregation, the first RF signal is transmitted in the first frequency band and the fifth RF signal is transmitted in the third frequency band; and
in a fourth carrier aggregation mode of operation supporting inter-band carrier aggregation, the third RF signal is transmitted in the second frequency band and the fifth RF signal is transmitted in the third frequency band.

14. The method of claim 9, wherein:
in a first carrier aggregation mode of operation supporting inter-band carrier aggregation, the first RF signal is transmitted in the first frequency band and the fourth RF signal is transmitted in the second frequency band; and
in a second carrier aggregation mode of operation supporting inter-band carrier aggregation, the second RF signal is transmitted in the first frequency band and the third RF signal is transmitted in the second frequency band.

15. The method of claim 9, further comprising selectively disabling each of the first passive mixer, the second passive mixer, the third passive mixer, and the fourth passive mixer based upon the carrier aggregation mode of operation.

16. The method of claim 9, further comprising:
multiplexing between the first LO signal used in a Frequency Division Duplex (FDD) mode of operation and a first received LO signal used in a Time Division Duplex (TDD) mode of operation; and
multiplexing between the second LO signal used in a FDD mode of operation and a second received LO signal used in a TDD mode of operation.

17. A radio frequency integrated circuit (RF IC) comprising:
digital processing circuitry configured to:
divide digital data into a first digital information signal and a second digital information signal; and
generate a carrier aggregation control signal based upon a carrier aggregation mode of operation;
first baseband circuitry configured to convert the first digital information signal into a first baseband signal;

second baseband circuitry configured to convert the second digital information signal into a second baseband signal;

local oscillation (LO) circuitry configured to produce a first LO signal and a differing second LO signal based upon the carrier aggregation control signal;

first RF signal path circuitry configured to service a first frequency band, comprising:
a first passive mixer configured to mix the first baseband signal and the first LO signal to produce a first RF signal at a first RF frequency;
a second passive mixer configured to mix the second baseband signal and the second LO signal to produce a second RF signal at a second RF frequency that differs from the first RF frequency, the output of the first passive mixer coupled to the output of the second passive mixer to produce a first outbound RF signal;
first enablement circuitry configured to selectively provide the first LO signal to the first passive mixer or the second LO signal to the second passive mixer; and
a first amplifier configured to amplify the first outbound RF signal; and second RF signal path circuitry configured to service a second frequency band, comprising:
a third passive mixer configured to mix the first baseband signal and the first LO signal to produce a third RF signal at a third RF frequency;
a fourth passive mixer configured to mix the second baseband signal and the second LO signal to produce a fourth RF signal at a fourth RF frequency that differs from the third RF frequency, the output of the third passive mixer coupled to the output of the fourth passive mixer to produce a second outbound RF signal; and
second enablement circuitry configured to selectively provide the first LO signal to the third passive mixer or the second LO signal to the fourth passive mixer; and
a second amplifier configured to amplify the second outbound RF signal.

18. The RF IC of claim 17, further comprising signal coupling circuitry configured to selectively couple the first outbound RF signal and the second outbound RF signal to at least one transmitting antenna.

19. The RF IC of claim 17, wherein each of the first passive mixer, the second passive mixer, the third passive mixer, and the fourth passive mixer are selectively enabled based upon the carrier aggregation mode of operation.

20. The RF IC of claim 17, wherein the LO circuitry further comprises:
a first multiplexer configured to multiplex between the first LO signal used in a Frequency Division Duplex (FDD) mode of operation and a first received LO signal used in a Time Division Duplex (TDD) mode of operation; and
a second multiplexer configured to multiplex between the second LO signal used in a FDD mode of operation and a second received LO signal used in a TDD mode of operation.

* * * * *